United States Patent [19]

Frye et al.

[11] 3,786,434

[45] Jan. 15, 1974

[54] FULL CAPACITY SMALL SIZE MICROPROGRAMMED CONTROL UNIT

[75] Inventors: Harold E. Frye, Hyde Park; Robert F. McMahon, Wappingers Falls, both of N.Y.

[73] Assignee: International Business Machines Corporation, Armonk, N.Y.

[22] Filed: Dec. 20, 1972

[21] Appl. No.: 316,792

[52] U.S. Cl. .......... 340/172.5
[51] Int. Cl. .......... G06f 9/16, G06f 9/00
[58] Field of Search .......... 340/172.5; 444/1

[56] References Cited

UNITED STATES PATENTS

| | | | |
|---|---|---|---|
| 3,483,528 | 12/1969 | Koerner | 340/172.5 |
| 3,195,109 | 7/1965 | Behnke | 340/172.5 |
| 3,631,400 | 12/1971 | Dervan et al. | 340/172.5 |
| 3,685,020 | 8/1972 | Meade | 340/172.5 |
| 3,643,225 | 2/1972 | Rice et al. | 340/172.5 |

OTHER PUBLICATIONS

"Microprogram Control for System/360" by S. G. Tucker, IBM Systems Journal Vol. 6, No. 4, 1967, pp. 222-241 L71401658.

*Primary Examiner*—Gareth D. Shaw
*Attorney*—Edward S. Gershuny

[57] ABSTRACT

A microprogrammed control unit comprising an instruction memory for storing microinstructions with no repetitions and an address memory for storing the addresses of microinstructions which make up a microprogram. Within the instruction memory, micro-orders are densely stored. Each time that a word is accessed from the instruction storage, a mask which is stored along with the address in the address storage is utilized to select appropriate micro-orders to produce a desired microinstruction. Through the use of the mask, and associated gates, each word in the instruction storage is capable of supplying a plurality of microinstructions to the system.

8 Claims, 5 Drawing Figures

PRIOR ART
FIG. 1
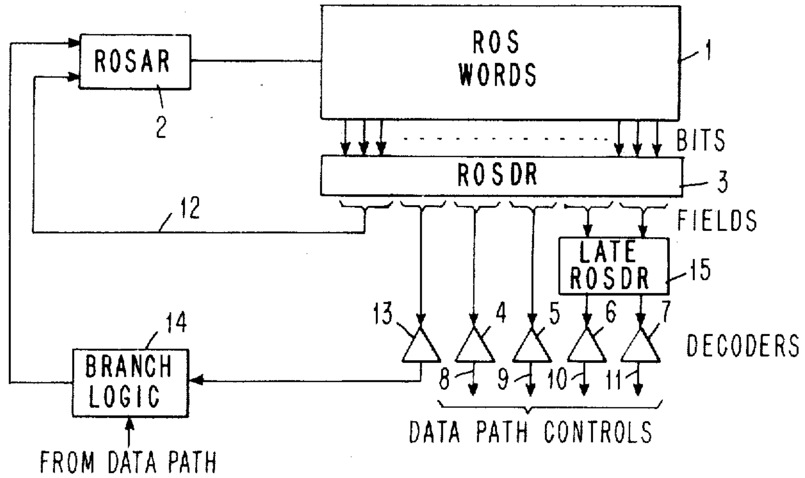
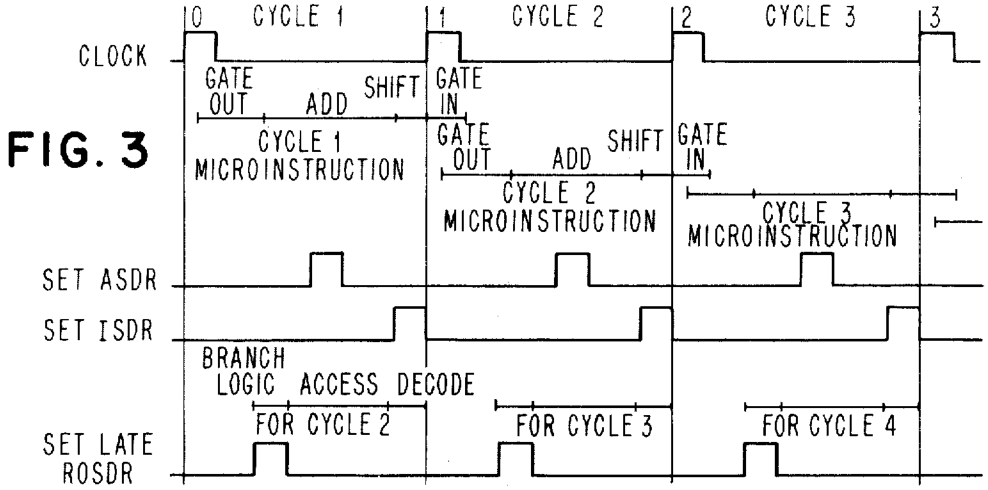
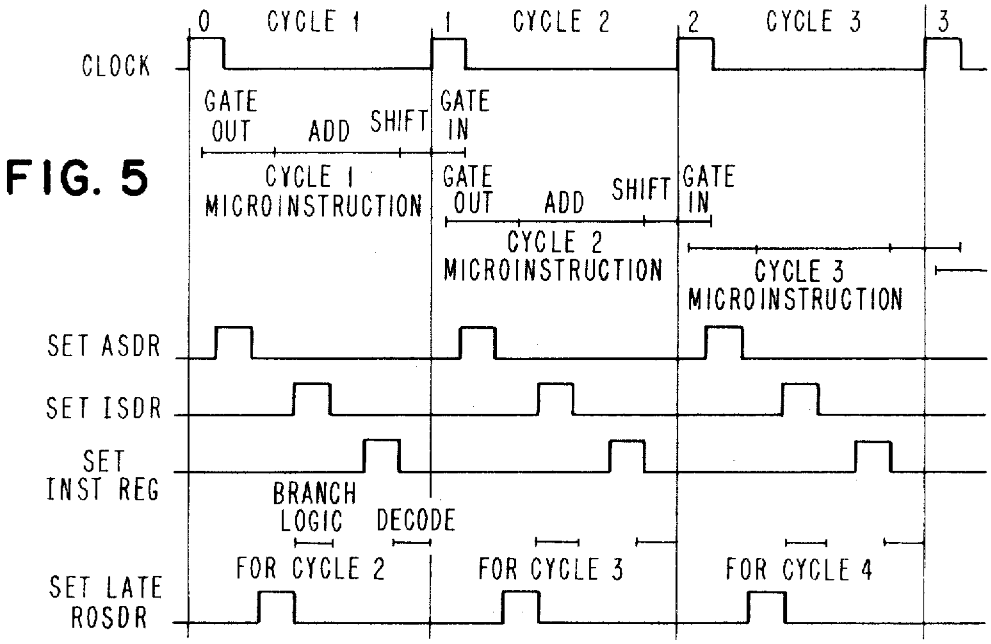

FULL CAPACITY SMALL SIZE MICROPROGRAMMED CONTROL UNIT

BACKGROUND OF THE INVENTION

This invention relates to control units for controlling the sequence of elementary operations within an electronic digital computer. More particularly, the invention relates to a microprogrammed control unit which is of reduced physical size.

A substantial percentage of all computers built in recent years have utilized microprogrammed control units to control the operations performed by a central processing unit (CPU) during the execution of an instruction. Under control of the microprogrammed control unit, the instruction is executed by the performance of a sequence of elementary operations, each of which occurs during a single CPU cycle. During each of these cycles, elementary operations are performed under the control of a microinstruction which has been accessed from the control unit. Generally, within a single CPU cycle, more than one elementary operation is performed (in parallel and/or in sequence within the cycle). Each elementary operation is performed under control of a "micro-order." A microinstruction thus contains several micro-orders, each of which is performed during one CPU cycle. A sequence of microinstructions which execute a given function (for example, a software instruction) make up a microprogram or micro routine.

In most microprogrammed systems, microinstruction sequencing is achieved by allocating a portion of each microinstruction for indicating the address of the next microinstruction to be performed. The next address portion is fed, along with branching controls, to the address register of the control unit in order to select the next microinstruction to be performed. In such a system, if a given microinstruction is used in several different micro routines, the instruction will be stored at several different places within a control storage. This replication is one factor which tends to increase the size of the control unit.

Another factor which affects the size of the control unit is micro-order density. Within each microinstruction, various fields are allocated to specific types or classes of micro-orders. If, within a given microinstruction, one or more of the micro-order classes is not utilized, then the field or fields allocated thereto will contain no information that is of substantial use to the system. The presence in the control storage of fields which, in effect, contain no information of value to the system also tend to increase the size of the control unit.

A system wherein there is no replication has been proposed by A. Graselli, "The Design of Program-Modifiable Micro-Programmed Control Units" IRE Transactions on Electronic Computers, June 1962, pages 336–339. In that system, microinstructions are stored in a control memory. The microinstructions do not contain a next address field. Sequencing of microinstructions is accomplished through the use of a path finder memory which may be loaded with sequences of microinstruction addresses which control the sequencing within a micro routine. The Graselli article does not address the density problem referred to above.

SUMMARY OF THE INVENTION

In accordance with a preferred embodiment of the invention, problems relating to replication and density are overcome by providing a microprogrammed control unit comprising an instruction memory for storing microinstructions with no repetitions and an address memory for storing the addresses of microinstructions which make up a micro routine. Within the instruction memory, micro-orders are stored in the micro words with high density. Each time that a micro word is accessed from the instruction storage, a mask which is stored along with the address in the address storage will be utilized to select appropriate microorders from the micro word to produce a desired microinstruction. Through the use of the mask, and associated gates, each micro word becomes capable of supplying a plurality of microinstructions to the system.

The primary advantage of this invention is that it permits a reduction in the number of words contained with a microprogrammed control unit. This reduction in the number of words will often lead to further advantages including, but not limited to, any or all of the following: reduction in the physical size of the control unit; reduction in power requirements; reduction in number of address bits required for addressing the instruction storage; etc. Of course, each of these advantages will tend to reduce the cost of the control unit and, therefore, the total cost of the system wherein it it utilized.

Another advantage that may be realized with this invention is that, for a control storage of a given size, an increased number of microinstructions may be stored. This can lead to increasing the power and/or the flexibility of a system.

The above and other objects, features and advantages of this invention will be apparent from the following description of preferred embodiments thereof as illustrated in the accompanying drawings.

DESCRIPTION OF THE DRAWINGS

FIG. 1 shows, in block diagram form, a prior art microprogrammed control unit;

FIG. 3 is a timing diagram illustrating the sequence of operations performed by the control unit of FIG. 2;

FIG. 5 is a timing diagram illustrating the sequence of operations performed by the control unit shown in FIG. 4.

DETAILED DESCRIPTION

Prior Art

FIG. 1 shows various details of a typical prior art microprogrammed control unit. A read only storage (ROS) 1 contains many words each of which is a microinstruction. Microinstructions are selected from the ROS by means of a read only storage address register (ROSAR) 2. The microinstruction that will control the operation of a central processing unit (CPU) for one cycle is read from ROS to a read only storage data register (ROSDR) 3. The microinstruction within the ROSDR is divided into fields each of which contains a micro-order. In order to decode the micro-orders and provide control signals to the computer system, a plurality of decoders 4–7 are provided. System control is provided via the decoder outputs 8–11. At least a portion of the address of the next microinstruction which is to be performed is provided to the ROSAR via line 12 from a next-address field within the microinstruction contained in the ROSDR. In order to accomplish logical branching within a micro routine, the output of a decoder 13 is applied, along with appropriate information from the system data path, to branch logic 14 the output of which also feeds the ROSAR. In order for a microinstruction to control system operation throughout a CPU cycle, the microinstruction should be in the ROSDR within a very short time after the beginning of the cycle. In order to accomplish this, it is generally necessary to set a new microinstruction into the ROSDR prior to the beginning of a cycle. However, provision must be made for saving micro-orders which control system operation at the very end of a cycle and at the immediate beginning of the next cycle. This is accomplished through the provision of a late ROSDR 15 in which certain micro-orders are saved when a new microinstruction is read into the ROSDR.

For additional details pertaining to the implementation and usage of prior art microprogrammed control units, reference is made to S. G. Tucker "Microprogram Control For System/360" IBM Systems Journal, Vol. 6, No. 4 (1967) pages 222–241 and to S. S. Husson "Microprogramming: Principles and Practices" Prentice-Hall, Inc. (1970). Both of these publications are to be regarded as being incorporated herein by this reference.

THE INVENTION

Figure 2:
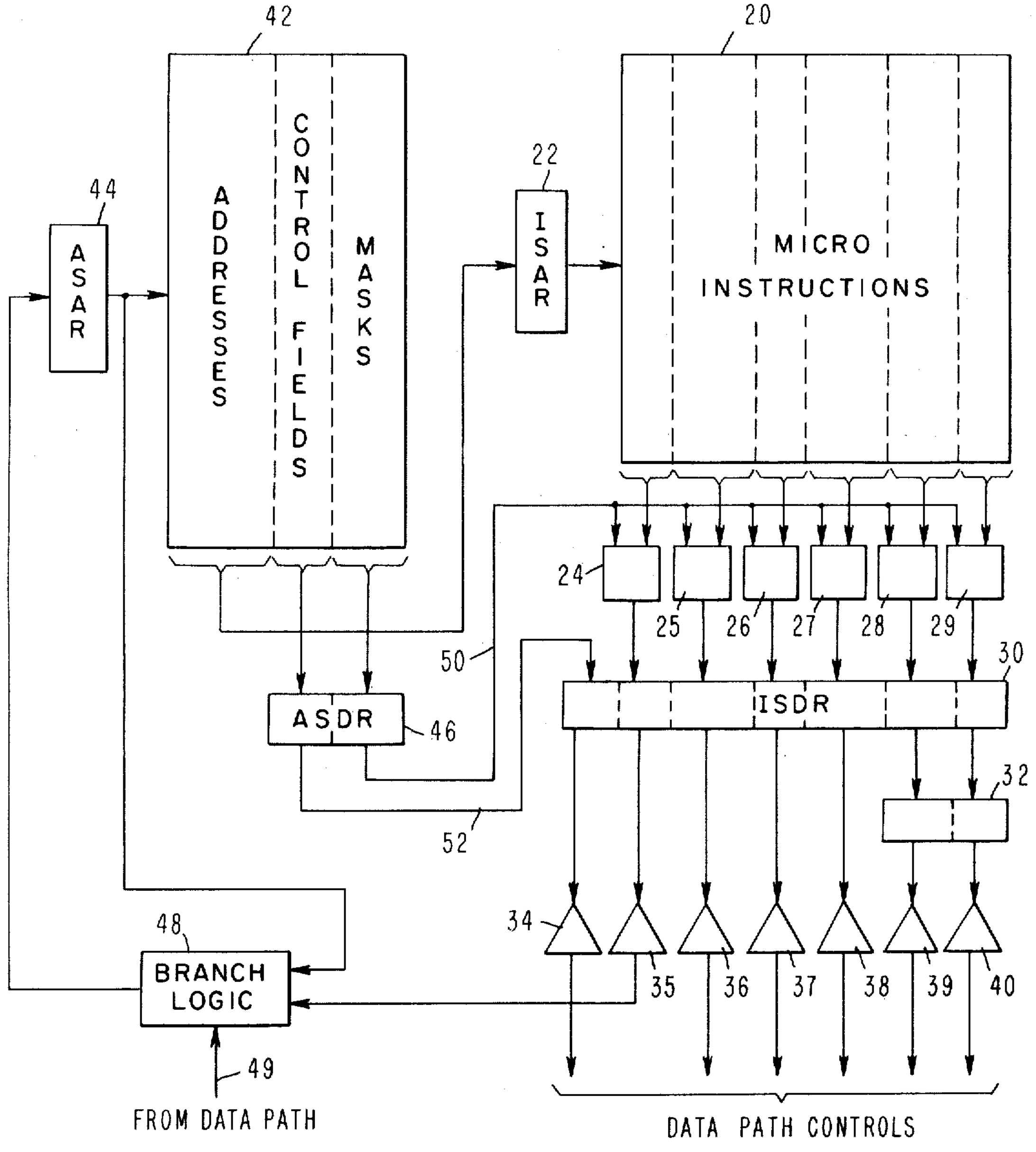
FIG. 2 depicts a microprogrammed control unit implemented in accordance with a preferred embodiment of this invention.

FIG. 2 shows various details of a microprogrammed control unit implemented in accordance with this invention. As instruction storage 20, which is preferably a read only storage, contains micro words each of which is divided into a number of fields with each field containing a micro-order. The various fields are indicated symbolically in the drawing by the broken vertical lines running through the instruction storage. Words are accessed from the instruction storage 20 under control of an instruction storage address register (ISAR) 22. Micro words are read from the instruction storage to a plurality of gates 24–29 the outputs of which provide micro-orders to an instruction storage data register (ISDR) 30 which holds a microinstruction. Connected to the ISDR 30 is a late ROSDR 32 which performs the same function as the late ROSDR 15 which was described with respect to FIG. 1. Also provided in the system shown in FIG. 2 are a plurality of decoders 34–40 which perform the same functions as the decoders 4–7 and 13 which are shown in FIG. 1.

In addition to the instruction storage 20, an address storage unit 42 is provided. Each word within the address storage contains the address of a word in the instruction storage 20 and mask. In the preferred embodiment of the invention, each word in address storage 42 also contains a control field. The purpose and manner of usage of each of these fields will be described below. Words are accessed from the address storage 42 under control of an address storage address register (ASAR) 44. When words are read from the address storage, the control and mask fields are read into an address storage data register ASDR 46. Although the address field of a word within the address storage 42 could also be read into the ASDR, in the preferred embodiment of the invention this address field is read directly into the ISAR 22. In order to provide for branching within a micro routine, branch logic 48 is provided. The branch logic receives its inputs from the ASAR 44, from the data path along line 49, and, in the preferred embodiment, from at least one of the decoders 35. The output of the branch logic 48 is used to control the addresses set into ASAR 44.

ORGANIZATION OF INSTRUCTION STORAGE

Each word in the instruction storage 20 contains a plurality of micro-orders. No two words are the same and, in the preferred embodiment, every micro-order field in every micro word contains a micro-order which can be decoded to control some aspect of system operation.

The make up of the various micro words within instruction storage 20 can be most easily described by way of a simple example. Consider a system wherein microinstructions are divided into six micro-order fields. Assume that, within the microprograms utilized by this system, there are four microinstructions A, B, C, D all of which contain identical micro-orders in the first four fields of their microinstructions. Also assume that microinstruction A contains no micro-order in the fifth or sixth field; microinstructions B and C contain identical micro-orders in their fifth fields; microinstruction B contains no micro-order in its sixth field; microinstruction D contains no micro-order in its fifth field; and microinstructions C and D contain identical micro-orders in their sixth fields. In prior art control systems, each of the microinstructions A, B, C, D would require one word within the microprogram storage resulting in four words being used to store the four microinstructions. When this invention is utilized, all four of the microinstructions A, B, C, D are stored in a single word in instruction storage 20. The first four fields in the word contain the micro-orders that are common to all of the microinstructions; the fifth field contains the micro-order that is common to instructions B and C; and the sixth field contains the micro-order that is common to instructions C and D. Thus, in this extremely simple hypothetical system wherein microinstructions contain only six micro-order fields, a single word is utilized to store up to 63 microinstructions each of which contains one or more micro-orders.

Selection of a desired microinstruction from among the micro-orders contained within a word in instruction storage 20 is accomplished by providing appropriate enabling inputs to gates 24–29 along lines 50 when a word is read from the instruction storage. This will result in the desired microinstruction being set into ISDR 30 for system control during one CPU cycle. Signals transmitted via lines 50 are derived from the mask field of the words contained within address store 42 as is described below.

ORGANIZATION OF ADDRESS STORE

Each word within the address store 42 contains the address of a word in the instruction store 20. In order to control a sequence of microinstructions which make up a micro routine, blocks of words in address store 42 are arranged in such an order as to specify the desired sequence in which words are to be accessed from the instruction storage in order to accomplish a micro routine. As was mentioned above, each of the words within the instruction storage 20 can supply various combinations of micro-orders, each different combination representing a different microinstruction. In order to select an appropriate combination of micro-orders from a given instruction word, each word within the address storage 42 also contains a mask field which, from ASDR 46, is used via lines 50 to control gates 24–29. In the preferred embodiment, the mask field contains a number of bit positions which is equal to the number of gates required for various micro-order fields. Thus, any combination of the micro-orders present in a word in the instruction storage 20 may be selected by an appropriate mask. It is in this manner that a plurality of micro-orders are selected for placement in ISDR 30 to be utilized for system control.

From the above description it will be seen that each class of micro-order is allocated a field within the instruction storage 20 and, for selection, requires one bit position within each word of the address storage 42. For a micro-order which is normally represented by a one-bit field, it would therefore be redundant to have it occupy a one-bit field within the instruction storage and also to occupy a bit position within the mask field of the words in the address storage. For this reason, in the preferred embodiment embodiment of the invention, all one-bit microorders are stored within a control field of the words contained in the address storage 42. These one-bit control fields are read from the address storage 42 to the ASDR 46 and then, via line 52, into the ISDR 30 along with the other micro-orders which comprise a microinstruction.

BRANCHING

During most of the time that the control unit shown in FIG. 2 is controlling operations within a data processing machine, the control unit will access successive words from address storage 42 and use them to select and mask appropriate words from instruction storage 20 to produce the microinstructions that are required to execute a particular CPU function. When the control unit is running sequentially in this manner, the branch logic 48 will perform as a simple counter, merely incrementing by 1 the address appearing in ASAR 44 during each cycle in order to cause a reference to the next successive word in address storage 42. However, situations will arise when, depending upon the condition of certain data and/or machine states, microprogram branching may be necessary.

In the preferred embodiment of the invention, branching is achieved in a manner that is substantially identical to that described in the above-referenced Tucker article. The branch logic 48 shown in FIG. 2 is similar to that shown in the Tucker article in that it receives inputs from the data path via line 49 and from at least one of the decoders 35, and its output is fed to the address register ASAR 44. This system differs from that shown by Tucker in that branch logic 48 also receives an input from ASAR 44. This is necessary because normal (that is, no-branch) sequencing is attained by merely incrementing the present ASAR address. The "Y-branch" described by Tucker (see particularly pages 230 and 231) may be achieved when using this invention by allowing data and/or machine status conditions to affect one or more address bits in the manner described by Tucker. Also, via line 49 into the branch logic 48, specific addresses that are stored elsewhere in the machine system can be set into ASAR 44 to permit branching within and among micro routines.

Another branching technique which may be used with this invention is described by A. Graselli, "The Design of Program-Modifiable Micro-Programmed Control Units" IRE Transactions on Electronic Computers, June 1962, pages 336–339, which publication is hereby incorporated into this specification. In the Graselli system, branching is achieved through the utilization of tags which mark the beginning and the end of a microprogramming loop. When the address of the last microinstruction in a loop is accessed, the tag associated with this address will signal the system that, depending upon data and/or system status, the next address to be accessed from the address memory 42 will be the address contained either in the next sequential word or the address contained in the word which was tagged as being the beginning of the microprogramming loop.

OPERATION OF THE CONTROL UNIT

A microprogram or micro routine is started by loading an initial address into the ASAR 44 in exactly the same manner that is described in the above-referenced Tucker and Husson publications. Thereafter, the control unit of this invention operates in a sequence that is illustrated by the timing diagram shown in FIG. 3. At the beginning of each CPU cycle, there is a main clock pulse which is shown in the first line of FIG. 3. Then, during each cycle (as illustrated by the next three lines in FIG. 3) data are gated out of various registers, operated upon in the system adder, shifted as appropriate, and then (at the very beginning of the next CPU cycle) gated into destination registers. In order for a microinstruction to be available for system control at the very beginning of a cycle, it is necessary that the microinstruction be set into the ISDR 30 (FIG. 2) just prior to the beginning of the cycle as is shown by the line labeled SET ISDR. Prior to setting of the ISDR, an address and mask must be read from the address storage 42 (FIG. 2) at an appropriate time as is shown by the line labeled SET ASDR. Also, prior to setting of the ASDR, all branch conditions must be resolved. As is shown in the next-to-last line in FIG. 3, a control unit memory cycle is divided into three portions: branch logic resolution; memory access (including setting of ASDR followed by setting of ISDR); and microinstruction decode. The decoding is completed by the beginning of the next cycle. The last line in FIG. 3 shows the setting of the late ROSDR for the reasons previously described.

Figure 4:
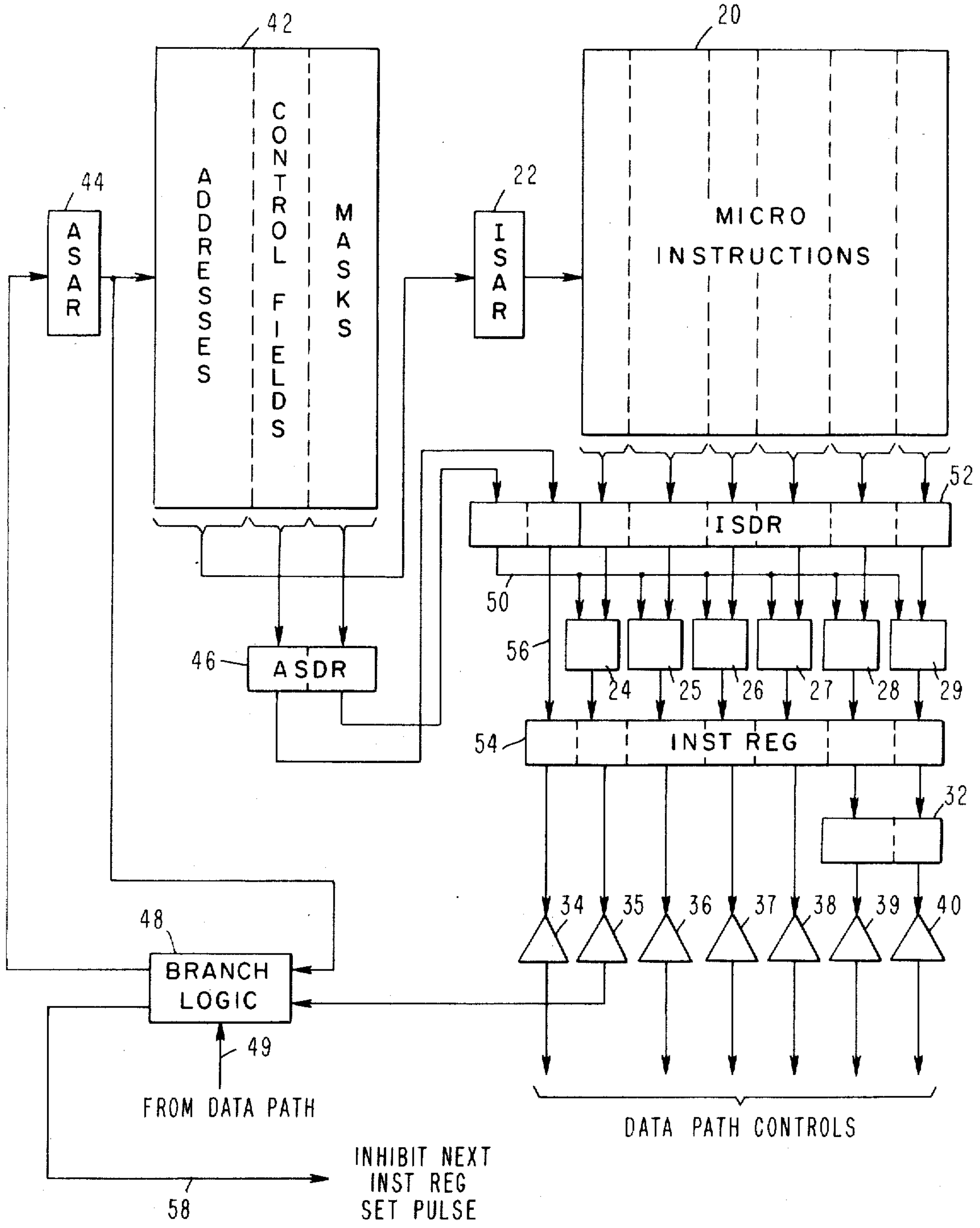
FIG. 4 shows a control unit implemented in accordance with an alternative embodiment of the invention.

With the exception of the line labeled SET ASDR, all of the timing lines shown in FIG. 3 are identical to those shown in FIG. 4 (page 231) of the above-referenced Tucker article. It should be noted that the interposition of the SET ASDR pulse between the branch logic resolution and the setting of ISDR (which corresponds to Tucker's SET ROSDR) may introduce timing problems in some systems. If one were to implement this invention using control unit memories which could not be operated quickly enough to sequentially read out from an address memory and from an instruction memory after branch logic resolution, an alternative method of branching could be used. In the alternative method, ASDR would be set early in the cycle, prior to complete resolution of the branch logic, under the assumption that no branch is to be taken. That is, the previous ASDR address would simply be incremented by 1. Then, if the branch logic were to indicate that a branch is to be taken (meaning that the address in ASDR is not correct), the next SET ISDR pulse would be inhibited to prevent readout of an incorrect microinstruction and the system would lose one cycle while the ASDR is being updated to properly reflect the microprogram branch. This alternative branching technique is the one that is utilized in an alternate embodiment of the invention which is described below with respect to FIG. 4.

ALTERNATIVE EMBODIMENT OF THE INVENTION

A control unit implemented in accordance with an alternative embodiment of the invention is shown in FIG. 4. Although the embodiment shown in FIG. 4 contains more circuitry than that shown in FIG. 2, and would thus be slightly more expensive to build, the alternative might be easier to implement if one were modifying an existing control unit to incorporate the invention. The principle differences introduced in the alternative embodiment of FIG. 4 are: the ISDR 52 will, after readout from instruction storage 20, contain the entire unmasked micro word; an extended portion of the ISDR 52 is utilized to temporarily store the control field and mask which has been read from address memory 42 into ASDR 46; and generation of the desired microinstruction will be attained by transferring the contents of ISDR 52 through gates 24–29 into an instruction register (INST REG) 54, with the mask controlling gates 24–29 via lines 50, and the one-bit control fields being transferred from ISDR 52 to INST REG 54 via lines 56. Those skilled in the art will recognize that, in this embodiment, ISDR 52 serves as a buffer for INST REG 54 and that, if one were designing a control unit in accordance with this invention, such a buffer would generally not be necessary. However, when altering an existing control unit to include this invention, it might be easier to use the embodiment shown in FIG. 4 because this embodiment avoids the interposition of gates 24–29 between the instruction storage 20 and its associated ISDR.

OPERATION OF THE ALTERNATIVE EMBODIMENT

The operation of the alternative embodiment of the invention is illustrated by the timing diagram of FIG. 5. In this diagram, it is assumed that branching is achieved by the alternative method which has been discussed.

In FIG. 5, the timing line labeled CLOCK (and the three microinstruction cycles illustrated therebelow) and the line labeled SET LATE ROSDR are identical to similarly labeled timing lines shown in FIG. 3. The line in FIG. 5 labeled SET INST REG corresponds to the line in FIG. 3 labeled SET ISDR and illustrates the timing for setting the register from which microinstructions are decoded.

As is illustrated in FIG. 5 by the timing line SET ASDR, the contents of a word in the address memory are set into the ASDR (and into the ISAR) very early in the cycle. Shortly thereafter, a word specified by the address in the ISAR is read from the instruction memory into the ISDR and the control and mask fields contained in the ASDR are also set into the extended portion of the ISDR. At an appropriate time, as illustrated by the timing line labeled SET INST REG, the desired microinstruction is set into the INST REG, under control of the mask which was previously read from the address memory. The three timing pulses for the ASDR, the ISDR and the INST REG occur far enough apart so that no significant timing problems will arise when implementing this invention with most control memories that are available today. So long as no microprogram branches are taken, the sequence just described will continue until the microprogram or micro routine has been completed.

As is indicated by the line in FIG. 5 below the timing line labeled SET INST REG, branch logic resolution occurs at a time in the cycle that is subsequent to the setting of the ASDR. If a branch is to be taken, this fact will be indicated by the branch logic after the ISAR has already been set with the address of a word in the instruction memory. In order to prevent an incorrect microinstruction from being set into the INST REG, the branch logic 48 of FIG. 4 will generate a signal on an output line 58 which will be used to inhibit (by means not shown) the next SET INST REG timing pulse to prevent an incorrect microinstruction from being set into the INST REG. This will result in the system skipping the next cycle.

One other difference introduced in the system timing illustrated in FIG. 5 is that the branch logic resolution occurs later in the cycle than was shown in FIG. 3. As is described in the Tucker article, it is desirable to allow branch resolution to occur as late as possible in a cycle. With the timing system illustrated in FIG. 5, the timing of branch logic resolution is critical only to the extent that the branch or no-branch condition must be resolved early enough so that the setting of the INST REG may be inhibited when a branch is to be taken, When using the timing shown in FIG. 5, there is no need to resolve branching conditions prior to the setting of the other reigsters.

OTHER ALTERNATIVES

Many modifications, in addition to those described above, may be made in any given implementation of this invention. For example, instead of (or in addition to) gates such as 24–29 in FIGS. 2 and 4 for selecting the micro-orders that are to be placed into an instruction register, a similar set of gates could be inserted between the instruction register and the micro-order decoders. In such a system, an entire word from the instruction storage could be placed into the instruction register, with only the appropriate micro-orders being selected for transmission to the decoders. The advantage of such a system would be that the presence of all zeros in a micro-order field could then be utilized as representing a valid micro-order code rather than as representing a no-operation (NOP). In this case the NOP would be represented by the absence of a signal rather than by an all-zero signal. Although this modification could be of value in certain applications, it could have an adverse effect upon the ability of the system to recognize malfunctions and is therefore not a part of the preferred embodiment.

Another alternative would be to use each word in the address memory to hold more than one address and mask. Each time that a word was read from the address memory, several addresses and masks would be read into an address storage data register, and a counter (or other appropriate means) would be utilized to step through the sequential address and mask fields.

Yet another modification would be to utilize writeable control stores instead of the read only control stores that have been referenced above. As is described by Graselli, one of the advantages of using a writeable store for the address memory is that microprograms and/or micro routines can be easily implemented and/or modified under program control.

Those skilled in the art will also recognize that it is not absolutely essential that every micro-order field in the micro-order storage contain a valid mocro-order code. It can be expected that, when a set of microinstructions are compacted into the instruction storage, one or more words will have at least one micro-order field that is not utilized in any of the microinstructions derived from that word. These fields could be left "empty" (that is, for example, filled with a bit sequence representing a NOP) or, in anticipation of the possibility of future expansion of the number of valid microorders, these fields could be filled with bit configurations that do not represent any presently recognizable micro-order.

While the invention has been particularly shown and described with reference to preferred embodiments thereof, it will be understood by those skilled in the art that the above and other changes in form and details may be made therein without departing from the spirit and scope of the invention.

What is claimed is:

1. For use in a data processing system, a microprogram control unit comprising:

an instruction storage for storing a plurality of words each containing a plurality of micro-order codes;

instruction storage addressing means for addressing said instruction storage;

instruction storage output means for holding a microinstruction which comprises micro-orders read from said instruction storage;

a plurality of selectively operable gating means connected between said instruction storage and said instruction storage output means;

an address storage for storing a plurality of words each containing the address of at least one word in said instruction storage and a configuration of mask bits representing the combination of microorders in said one word which comprise a desired microinstruction;

address storage addressing means for addressing said address storage;

address storage output means for holding data read from said address storage;

means responsive to an address in said address storage addressing means to cause a word to be read from said address storage;

means for causing an address read from said address storage to be transmitted to said instruction storage addressing means;

means for causing a configuration of mask bits related to said last-named address to be transmitted to said address storage output means;

means responsive to an address in said instruction storage addressing means to cause a word to be read from said instruction storage to said gating means;

enabling means connected between said address storage output means and said gating means for enabling selected ones of said gating means in accordance with said configuration of mask bits; and means for causing micro-order codes which were read to gating means that were enabled by said enabling means to be transmitted to said instruction storage output means to form at least a portion of a microinstruction for controlling said data processing system.

2. The microprogram control unit of claim 1 further including:

branch resolution means for determining addresses which are set into said address storage addressing means;

said branch resolution means having a first input connected to said address storage addressing means, a second input connected to another element of said data processing system for receiving status representation signals, and an output connected to said address storage addressing means for transmitting addresses thereto.

3. The microprogram control unit of claim 2 wherein:

each of said plurality of words in said address storage contains a bit configuration representing at least one micro-order; said control unit further comprising said means for causing a micro-order to be transmitted to said address storage output means when mask bits are transmitted thereto; and means for causing a micro-order to be transmitted from said address storage output means to said instruction storage output means to form another portion of said microinstruction for controlling said data processing system.

4. The microprogram control unit of claim 2 wherein said branch resolution means comprises:

incrementing means for incrementing an address received from said address storage addressing means by a predetermined amount to form a tentative next address, said tentative next address being transmitted to said address storage addressing means;

branch address generating means responsive to signals received at the inputs of said branch resolution means to generate an actual next address when said signals indicate that a microprogram branch is to be taken; and means for generating an output inhibit signal when a microprogram branch is to be taken, said inhibit signal being utilized to prevent the setting of an incorrect microinstruction into said instruction storage output means.

5. For use in a data processing system, a microprogram control unit comprising:

an instruction storage for storing a plurality of words each containing a plurality of micro-order codes;

instruction storage addressing means for addressing said instruction storage;

instruction storage output means for holding a word read from said instruction storage;

instruction register means for holding a microinstruction which comprises micro-orders read from said instruction storage;

a plurality of selectively operable gating means connected between said instruction storage output means and said instruction register means;

an address storage for storing a plurality of words each containing the address of at least one word in said instruction storage and a configuration of mask bits representing the combination of microorders in said one word which comprise a desired microinstruction;

address storage addressing means for addressing said address storage;

address storage output means for holding data read from said address storage;

means responsive to an address in said address storage addressing means to cause a word to be read from said address storage;

means for causing an address read from said address storage to be transmitted to said instruction storage addressing means;

means for causing a configuration of mask bits related to said last-named address to be transmitted to said address storage output means;

means responsive to an address in said instruction storage addressing means to cause a word to be read from said instruction storage to said instruction storage output means;

means for transmitting said last named configuration of mask bits from said address storage output means to said instruction storage output means;

enabling means connected between said instruction storage output means and said gating means for enabling selected ones of said gating means in accordance with said configuration of mask bits; and means for causing micro-order codes held in said instruction storage output means to be transmitted through the ones of said gating means that were enabled by said enabling means to said instruction register means to form at least a portion of a microinstruction for controlling said data processing system.

6. The microprogram control unit of claim 5 further including:

branch resolution means for determining addresses which are set into said address storage addressing means;

said branch resolution means having a first input connected to said address storage addressing means, a second input connected to another element of said data processing system for receiving status representation signals, and an output connected to said address storage addressing means for transmitting addresses thereto.

7. The microprogram control unit of claim 6 wherein:

each of said plurality of words in said address storage contains a bit configuration representing at least one micro-order; said control unit further comprising means for causing a micro-order to be transmitted to said address storage output means when mask bits are transmitted thereto; and means for causing a micro-order to be transmitted from said address storage output means to said instruction storage output means and thence to said instruction register means to form another portion of said microinstruction for controlling said data processing system.

8. The microprogram control unit of claim 6 wherein said branch resolution means comprises:

incrementing means for incrementing an address received from said address storage addressing means by a predetermined amount to form a tentative next address, said tentative next address being transmitted to said address storage addressing means;

branch address generating means responsive to signals received at the inputs of said branch resolution means to generate an actual next address when said signals indicate that a microprogram branch is to be taken; and means for generating an output inhibit signal when a microprogram branch is to be taken, said inhibit signal being utilized to prevent the setting of an incorrect microinstruction into said instruction register means.

* * * * *